United States Patent [19]
Haase

[11] Patent Number: 6,120,690
[45] Date of Patent: *Sep. 19, 2000

[54] CLARIFICATION OF WATER AND WASTEWATER

[76] Inventor: Richard Alan Haase, P. O. Box 623, Sugar Land, Tex. 77487-0623

[*] Notice: This patent is subject to a terminal disclaimer.

[21] Appl. No.: 09/140,203

[22] Filed: Aug. 12, 1998

Related U.S. Application Data

[63] Continuation-in-part of application No. 08/931,167, Sep. 16, 1997, abandoned.

[51] Int. Cl.$^7$ .................................................. C02F 1/56
[52] U.S. Cl. ........................ 210/728; 210/735; 210/736; 252/180
[58] Field of Search .................................. 210/725, 727, 210/728, 735, 736, 721, 764; 252/180, 181

[56] References Cited

U.S. PATENT DOCUMENTS

| | | | |
|---|---|---|---|
| 3,823,088 | 7/1974 | Box et al. | 210/63 |
| 3,886,194 | 5/1975 | Levin et al. | 210/764 |
| 4,115,264 | 9/1978 | McCarthy et al. | 210/63 R |
| 4,268,399 | 5/1981 | Box et al. | 210/762 |
| 4,304,673 | 12/1981 | Reynolds et al. | 210/721 |
| 4,330,407 | 5/1982 | Shermer et al. | 210/602 |
| 4,450,092 | 5/1984 | Huang | 252/181 |
| 4,655,934 | 4/1987 | Rose et al. | 210/728 |
| 4,746,457 | 5/1988 | Haasick et al. | 252/181 |
| 4,765,923 | 8/1988 | Walterick | 252/181 |
| 4,800,039 | 1/1989 | Hassick et al. | 210/705 |
| 5,182,094 | 1/1993 | Kvant et al. | 423/462 |
| 5,262,059 | 11/1993 | Pohl | 210/691 |
| 5,474,703 | 12/1995 | Ritter | 252/181 |
| 5,543,056 | 8/1996 | Murcott et al. | 210/705 |

OTHER PUBLICATIONS

The Merck Index, 1983, p 494.
Technical Data Sheets, Richard A. Haase, CV 1120, CV 1135, CV 3210, cv 3250, CV3650 CV 3670, CV B10 3010XS.

*Primary Examiner*—Peter A. Hruskoci
*Attorney, Agent, or Firm*—Sue Z. Shaper; Felsman, Bradley, Vaden, Gunter & Dillon, LLP

[57] ABSTRACT

This invention provides a process for clarifying waters and wastewaters by using aluminum salts and/or aluminum polymers and newly formulated high molecular weight quaternized polymers. The aluminum polymers and the high molecular weight quaternized polymers are blended in the water or wastewater to form a flocculated suspension, causing liquid-solid separation. The quaternized polymers have a molecular weight of greater than approximately 1,000,000 and have a viscosity greater than about 1,000 cps at a concentration of approximately 20% in water. Preferably, poly-aluminum hydroxychloride, poly-aluminum chloride and poly-aluminum siloxane sulfate are used as aluminum polymers along with high molecular weight quaternized polymers such as di-allyl di-methyl ammonium chloride (DADMAC), to significantly improve liquid-solid separation in waters and wastewaters. Aluminum salts, such as alums and aluminum chloride, can also be used along with the quaternized polymers to clarify water. In addition, algae can be removed from water by blending at least one aluminum salt and/or at least one aluminum polymer with a quaternized polymer.

22 Claims, No Drawings

6,120,690

CLARIFICATION OF WATER AND WASTEWATER

This application is a continuation-in-part of application Ser. No. 08/931,167, filed on Sep. 16, 1997 now abandoned.

BACKGROUND OF THE INVENTION

1. Field of the Invention

This invention relates to a process for clarifying waters and wastewaters and removing organic and inorganic contaminants from the waters and wastewaters. Aluminum polymers, such as poly-aluminum hydroxychloride, poly-aluminum chloride and poly-aluminum siloxane sulfate, are combined with newly formulated high molecular weight quaternized polymers, such as di-allyl di-methyl ammonium chloride (DADMAC), to significantly improve liquid-solid separation in waters and wastewaters. This combination is further enhanced by blending the aluminum polymer with an aluminum salt. The DADMAC polymer is enhanced by blending with polymers of epichlorohydrin di-methyl amine (Epi-DMA) and/or with low molecular weight DADMAC polymers.

2. Description of the Prior Art

In recent years, the problem of cleaning waters and disposing wastewaters has become more acute due to increasing population and increasing industrial activity. (The term "raw waters", which is used in the industry and is the technical term for describing waste-containing waters, is used hereafter to refer to any water that requires treatment, including for example industrial, agricultural, domestic and potable water.) Numerous solutions have been developed for treating raw waters. Separation of solids from liquids has been practiced for hundreds of years. However, various new processes, devices and materials have been suggested during the past decades for separation of solids from liquids.

Some patents that have been issued in an attempt to solve water treatment problems are focused on chemical treatment of raw waters. However, such patents are mostly specialized and particularly protect a limited area. For example, a few patents are solely oriented towards removal of organic (but not inorganic) contaminants from water. (Pohl, U.S. Pat. No. 5,262,059, issued on Nov. 16, 1993, patents a method of removing organic contaminants from raw waters that contain an undesired liquid organic contaminant such as an organic solvent. Box, Jr. et al., U.S. Pat. No. 4,268,399, issued on May 19, 1981, patent a process for purification of organically polluted water using a zinc titanate catalyst under oxidizing conditions. McCarthy et al., U.S. Pat. No. 4,115,264, issued on Sep. 19, 1978, patent a method of purifying organically polluted water containing negligible amounts of alkali metal by contacting the polluted water with an oxygen-containing gas and a catalyst effective to promote such liquid phase oxidation. Box, Jr. et al., U.S. Pat. No. 3,823,088, issued on Jul. 9, 1974, patent a method of purifying organically polluted water by contacting the polluted water with a catalyst comprising zinc aluminate promoted with at least one metal active for initiating oxidative reactions in the liquid or gaseous phase under oxidizing conditions. Hassick, et al., U.S. Pat. No. 4,746,457, issued on May 24, 1988, patents the use of aluminum chloride/water soluble cationic polymer compositions having inorganic:polymer activity ratios of at least 5:1 and preferably 10:1 to 100:1. Hassick et al., U.S. Pat. No. 4,800,039, issued on Jan. 24, 1989, patents the use of aluminum chlorohydrate/water soluble cationic polymer compositions having inorganic:polymer ratios of at least 5:1 and preferably 20:1 for clarifying low turbidity waters. Kvant et al., U.S. Pat. No. 5,182,094, issued on Jan. 26, 1993, patents a process for the preparation of polyaluminum hydroxide complexes using aluminum compounds. Ritter, U.S. Pat. No. 5,474,703, issued on Dec. 12, 1995, patents a method for clarifying bodies of water and eliminating algal bloom caused by planktonic algae using a flocculating agent prepared in an aqueous solution containing a combination of monomeric or polymeric aluminum salts and a polybasic carboxylic acid.)

The above-listed patents and many other similar inventions have been developed, some of which still exist in the market. Although many different issues have been solved by previously- and presently-existing purification and clarification processes and materials, there still remains room for improvement in the area of clarification of raw waters for industrial and municipal purposes. There remains a need for improved materials and processes for separation of solids from raw waters.

SUMMARY OF THE INVENTION

A primary object of the invention is to devise an effective, efficient and economically-feasible process for separating solids from raw waters, such that the treated waters meet or exceed local, state and/or federal guidelines.

Another object of the invention is to devise an economically-feasible process for treating raw waters containing organic and/or inorganic contaminants.

Yet another object of this invention is to devise a process for treating raw waters that requires a minimal amount of treatment chemicals.

Still another object of this invention is to devise a process for treating raw waters with low alkalinity.

An additional object of this invention is to devise a process for treating raw waters, such that equipment investment and operating capital that are needed in the treatment process are minimized.

A final object of this invention is to provide a process for treating raw waters, such that removal of color units, turbidity units, oil and grease are enhanced and simplified.

Additional objects and advantages of the invention will be set forth in part in a detailed description which follows, and in part will be obvious from the description, or may be learned by practice of the invention.

The present invention provides a process for chemical treatment of water and wastewaters (referred to throughout the application as "raw waters") to achieve clarification. Aluminum polymers, such as poly-aluminum hydroxychloride (also known as aluminum chlorohydrate or ACH), poly-aluminum chloride (PAC) or poly-aluminum siloxane sulfate (PASS), are chemically combined with newly formulated high molecular weight quaternized polymers, such as di-allyl di-methyl ammonium chloride (DADMAC), either prior to storage at a water production facility or during a chemical cleaning process of the water production facility to clarify raw waters and to remove any organic and inorganic contaminants. The quaternized polymer has a molecular weight of greater than approximately 1,000,000 and has a viscosity greater than about 1,000 cps at a concentration of approximately 20% in water. Low molecular weight DADMAC has a molecular weight ranging from 50,000 to 1,000,000. High molecular weight DADMAC has a molecular weight ranging from 1,000,000 to 3,000,000. Low molecular weight epichlorohydrin di-methyl amine (Epi-DMA) has a molecular weight ranging from 20,000 to 500,000. High molecular weight Epi-DMA has a molecular weight ranging from 500,000 to 3 million. The present invention further provides a process for turbidity and color reduction that combines aluminum polymers and aluminum chloride with high-molecular weight DADMAC polymers and/or with epichlorohydrin di-methyl amine (Epi-DMA) polymers and/or low molecular weight DADMAC. The addition of aluminum chloride provides enhanced color reduction, while the addition of epichlorohydrin di-methyl amine polymers or low molecular weight DADMAC polymers increases the effectiveness of the aluminum polymers at turbidity reduction.

It is to be understood that the descriptions of this invention are exemplary and explanatory, but are not restrictive, of the invention. Other objects and advantages of this invention will become apparent from the following specification and from any accompanying charts, tables, examples and drawings.

DETAILED DESCRIPTION OF THE PREFERRED EMBODIMENT

Preferred embodiments of the present invention are illustrated in any charts, tables and examples that are included.

The present invention provides a process and materials for chemically treating raw waters to achieve clarification. The process and the chemical products that are presented significantly improve liquid-solid separation processes that presently exist in the market. The invention is also directed towards the removal of any organic and inorganic matter from raw waters.

The process for clarification of raw waters by chemical treatment is focused on application of a high molecular weight quaternized polymer to the raw water. The high molecular weight quaternized polymer of the present invention has a molecular weight greater than approximately 1,000,000 and has a viscosity greater than about 1,000 cps at a concentration of about 20% in the raw water. Low molecular weight DADMAC has a molecular weight ranging from 50,000 to 1,000,000. High molecular weight DADMAC has a molecular weight ranging from 1,000,000 to 3,000,000. Low molecular weight epichlorohydrin di-methyl amine (Epi-DMA) has a molecular weight ranging from 20,000 to 500,000. High molecular weight epichlorohydrin has a molecular weight ranging from 500,000 to 3 million. In one version, the clarification process comprises blending at least one aluminum polymer with a high molecular weight quaternized polymer in the raw water to form a flocculated suspension. In another version, the clarification process comprises blending aluminum chloride with a high molecular weight quaternized polymer and aluminum polymer in the raw water to form a flocculated suspension. In still another version, the clarification process comprises blending at least one aluminum polymer or a combination of any aluminum salts and polymers with a high molecular weight quaternized polymer and/or an epichlorohydrin di-methyl amine polymer or low molecular weight DADMAC in the raw water to form a flocculated suspension. In still another version, the clarification process comprises the use of an aluminum salt with a high molecular weight quaternized polymer in the water to form a flocculated suspension.

This invention uses various new chemical combinations to significantly improve liquid-solid separation in raw waters. (To simplify the description of the present invention, "separation" would implement complete or significant separation.) The quaternized polymer is preferably a polymeric quaternary ammonium compound. The preferred embodiments of the quaternized polymer are high molecular weight di-allyl di-methyl ammonium chloride (DADMAC) having a molecular weight of at least about 1,000,000 to about 3,000,000 and high molecular weight epichlorohydrin di-methyl amine (Epi-DMA) having a molecular weight of at least about 500,000 to about 3,000,000. Low molecular weight epichlorohydrin di-methyl amine (Epi-DMA) has a molecular weight ranging from 20,000 to 500,000. The aluminum polymer that is used is poly-aluminum hydroxychloride (i.e. aluminum chlorohydrate), poly-aluminum chloride, poly-aluminum siloxane sulfate or any combination of poly-aluminum hydroxychloride, poly-aluminum chloride and poly-aluminum siloxane sulfate. Optionally, the aluminum polymer can be blended with an aluminum salt, namely an alum or an aluminum chloride, or with any combination of the aluminum salts. If desired, the quaternized polymer can be blended with a low molecular weight Epi-DMA or with a low molecular weight DADMAC.

Clarification units and flotation units are among numerous devices that have been used to provide liquid-solid separation. In general, clarification units are used to separate inorganic and organic contaminants that are heavier than water (i.e. specific gravity>1.0) from one another. On the other hand, flotation units are applied to separate inorganic and organic contaminants that are lighter than water (i.e. specific gravity<1.0) from one another. In both cases, chemicals are added to raw water to separate organic and inorganic contaminants from the raw water. Basically, one common feature in the operation of clarification units and of flotation units is a final stage in the chemical cleaning process when flocculation occurs. During flocculation, contaminants that are removed from the raw water are aggregated into flocs that can be removed by settling or flotation prior to storage of the clarified water.

Flocs settle in a bottom portion of clarification units. Thus, flocs are removed from the bottom portion of clarification units. With floc settling velocity being proportional to the square of floc diameter (Stoke's Law of Liquid-Solid Separation), floc size is a direct determinant of plant production capability. However, in flotation units, flocs are floated to surface with bubbles of air or nitrogen before removal by a mechanical skimming device. If a filter is being used, flocs accumulate on the filter. The filter can then be washed or disposed of.

In addition, water alkalinity and water turbidity play a role in improving the clarification of drinking waters. Chemical sites, that are formed for microfloc formation prior to flocculation growth stage, vary with alkalinity. Said chemical sites are critical in chemical cleaning of the water with iron salts and with aluminum salts, as well as with aluminum polymers. It is well-known that significantly greater chemical dosages are needed for clarification of water with low alkalinity than for clarification of water with high alkalinity. (Water having a low alkalinity can be defined as water with a total alkalinity of less than 30 parts per million (ppm). Water having a high alkalinity can be defined as water with alkalinity of greater than 60 ppm.) Of course, inorganic and organic particulate matter can replace alkalinity in the chemical cleaning process. Particulate matter is measured in turbidity units. Therefore, water having a low alkalinity and a low turbidity is very difficult to clean. It is common for plants with individual turbidity and alkalinity values less than 10 ppm to add clay and/or lime to the water to facilitate the chemical cleaning operation. Clay and/or lime is then removed with any accumulated floc and disposed.

Final water pH is an important parameter in drinking water units as low pH water can present a bad taste to many individuals. Final water pH targets are normally between 7.5 and 9.0. However, since the chemical cleaning process is normally performed with a salt of aluminum or of iron, the pH is normally lowered in the raw waters during chemical cleaning to keep the cations available. Often, the water pH is reduced to the 4.5 to 6.5 range. Raising the pH back to the 7.5 to 9.0 range requires the addition of either caustic or lime at considerable expense.

When aluminum chlorohydrate (i.e. poly-aluminum hydroxychloride) reacts to chemically clean the raw waters, hydroxyl groups are released into the raw waters. Chemical treatment with aluminum chlorohydrate normally maintains or slightly increases the raw water pH. Therefore, treatment with aluminum chlorohydrate saves costs due to a reduction in the amount of either caustic or lime required to raise the pH. However, floc size is normally a limiting factor to the application of aluminum chlorohydrate.

It is further known that usage of quaternized polymers can reduce the amount of aluminum salts or iron salts necessary to grow flocs. This reduction also saves costs since less aluminum salt addition leads to less pH correction.

The chemical products may be used in raw water production plants for clarification of raw waters. The chemical products have also provided satisfactory results in processes for separation of oil from raw waters. Clarification units, flotation units and filtration units also serve as favorable sites for application of the chemical products.

An important aspect of the invention relates to providing new materials that can significantly improve liquid-solid separation. Polymeric quaternary ammonium compounds (also known as ionene polymers or polyquats), containing chlorides or bromides as anions, have been used for cleaning and clarification of raw waters. In addition, aluminum salts, such as aluminum sulfate and aluminum chloride, have been used for decades to clean water. In recent years, there has been the development of aluminum polymers such as aluminum chlorohydrate, poly-aluminum chloride and poly-aluminum siloxane sulfate. However, while each of these aluminum polymers have the ability to clean water with a lower dosage than that required with aluminum salts, these aluminum polymers create a very small floc as compared to that available with the aluminum salts. According to Stoke's Law of Liquid-Solid Separation, a small floc can present significant production restraints in water production equipment that is designed to separate the floc from the water.

In the past decade, blends of quaternized polymers with aluminum polymers have been formulated in order to minimize any limitations to the raw waters clarification process. The development of blends of the new quaternized polymers with aluminum polymers is aimed at significantly improving the flocculation capability of the aluminum polymers. However, this technology proposes blends of a high molecular weight quaternized polymer with at least one aluminum polymer to have provided satisfactory results, even for raw unclarified waters with alkalinity of less than 30 ppm. A preferred embodiment of the new material is a blend of di-allyl dimethyl ammonium chloride (DADMAC), in a high molecular weight formulation (i.e. molecular weight units of approximately 1,000,000 to 3,000,000), with either aluminum chlorohydrate or poly-aluminum chloride. The most preferable range of high molecular weight DADMAC to aluminum chlorohydrate is from about 10% to about 90%. Similarly, for poly-aluminum chloride, a concentration ranging from approximately 10% to 90% is preferred for high molecular weight DADMAC to polyaluminum chloride. Also, the range of high molecular weight DADMAC to polyaluminum siloxane sulfate is preferably from about 10% to about 90%. Blends of DADMAC or polyquaternary amines, such as epichlorohydrin dimethyl amine (Epi-DMA), having a low molecular weight (i.e. molecular weight units of approximately 20,000 to 500,00), with aluminum chlorohydrate have been applied. Blends of the new materials have a much higher molecular weight range of DADMAC and, thus, provide a system that cleans raw waters much more efficiently and effectively. Traditional DADMACs are sold at a molecular weight of about 50,000 to 700,000 which correlates to a viscosity in the range of about 50 cps to about 700 cps at a concentration of about 20% in water. In comparison, the new DADMACs have a viscosity of about 1,000 cps to approximately 3,000 cps at a concentration of about 20% in water. Improved water cleaning and flocculation performance is normally observed, with a 20% active product, at viscosities greater than about 1,000 cps and the polymer molecular weight is at least about 1,000,000 to about 3,000,000.

Blends of a high molecular weight quaternized polymer with waste catalyst aluminum chloride have provided satisfactory results as well, even for raw unclarified waters with alkalinity of less than 30 ppm. A preferred embodiment of the new material is a blend of di-allyl di-methyl ammonium chloride (DADMAC), in a high molecular weight formulation (i.e. molecular weight units of about 1,000,000 to 3,000,000), with waste catalyst aluminum chloride. The most preferable range of DADMAC to aluminum chloride concentration is from about 10% to about 90%. Blends of waste catalyst aluminum chloride with DADMAC or with polyquaternary amines, such as epichlorohydrin dimethyl amine (Epi-DMA), were applied with low molecular weight quaternized polymers (i.e. molecular weight units of about 20,000 to 500,000). Blends of the new materials have a much higher molecular weight range of DADMAC and, thus, provide a system that cleans raw waters much more efficiently and effectively. Also, of considerable importance is the fact that aluminum chloride can be supplied from waste catalyst streams.

Finally, blends of a high molecular weight quaternized polymer with at least one aluminum salt, at least one aluminum polymer or a combination of any aluminum salts and polymers have provided satisfactory results, while simultaneously causing the removal of algae from the raw water. A preferred embodiment of the new material is a blend of di-allyl di-methyl ammonium chloride (DADMAC), in a high molecular weight formulation (i.e. molecular weight units of about 1,000,000 to about 3,000,000 with at least one aluminum salt, at least one aluminum polymer or a combination of any aluminum salts and polymers. The most preferable range of DADMAC to aluminum polymer is from about 10% to about 90%. The aluminum salts are alums, aluminum chlorides or any combinations of the alums and the aluminum chlorides.

The molecular weights of these newly formulated high molecular weight DADMACs are 5 to 10 times greater than the traditionally available DADMACs. These high molecular weight DADMACs, in combination with aluminum polymers, provides many benefits in the production of clean water. Blending different aluminum polymers with the high molecular weight DADMACs provides more efficient results than those obtained by prior art. Also, blending aluminum chloride with the high molecular weight DADMACs increases the efficiency of the clarification process. In addition, the efficiency is increased by blending at least one aluminum polymer or a combination of any aluminum salts and polymers with a high molecular weight quaternized polymers and a low molecular weight Epi-DMA or DADMAC in the raw water to form a flocculated suspension. Finally, blending at least one aluminum salt, at least one aluminum polymer or a combination of any aluminum salts and polymers with high molecular weight DADMACs provides improved data, while simultaneously causing the reduction of turbidity, of color and of algae from the raw waters.

Color units, turbidity units, oil and grease are removed more easily.

There is an increase in the size of flocs, resulting in higher rates of floc settlement than rates available for flocs with lower molecular weights. The increase in the floc size is particularly significant when the newly formulated DADMACs are used in concert with the new aluminum polymers.

There is a reduced usage of an inorganic chemical that is required to clean raw waters. In the case of aluminum salts or polymers, the reduction can be in the range of about 30 percent to about 70 percent. The reduced usage of the inorganic chemical can be a determinative factor in the application of the aluminum polymer, since aluminum polymers create a very small floc in comparison to that available from aluminum salts.

The required amount of pH adjustment is significantly reduced. Usually, either caustic or lime is used to accomplish this raise of final water pH in drinking water plants. Since the high molecular weight DADMACs reduce the required amounts of aluminum salt and often allow the application of aluminum polymers, the high molecular weight DADMACs present significant cost savings to drinking water plants.

Significant cost savings are provided in the clarification of water that has low alkalinity. In combination with aluminum polymers, the high molecular weight DADMACs present significant chemical cost savings in low alkalinity water. The high molecular weight DADMACs are able to provide sites of micro-flocculation, achieving flocculation despite insufficient alkalinity or turbidity. Thus, there is a reduction in the amount of chemicals needed for cleaning low alkalinity water with the high molecular weight DADMACs in combination with aluminum polymers (versus salts or salts in combination with traditional polyquaternary amines).

The high molecular weight DADMACs make a larger floc at lower dosages than would normally be required with traditional DADMACs. Formation of larger flocs at lower dosages is particularly beneficial in oil/water separation as would normally be accomplished in a flotation unit.

The process of the present invention can be carried out under a variety of conditions and in many different apparatus. Numerous tests have been performed on the clarification process. Optimizing the clarification process has been a common goal of all the tests. The results of some of the tests run for enhancing clarification of the raw waters follow:

EXAMPLE 1

In the water production facility of Bonham, Tex., aluminum sulfate, a low molecular weight DADMAC and bentonite clay are used to produce water with a turbidity ranging from about 0.1 NTU to about 0.3 NTU. The alkalinity normally is between about 10 ppm to about 20 ppm. The raw turbidity usually ranges from about 3 to about 6. The chemical dosages are normally from about 40 ppm to about 60 ppm alum, about 10 ppm bentonite clay and about 20 ppm low molecular weight DADMAC.

Jar tests were performed with a polyaluminum chloride/aluminum chlorohydrate blend of Applicant (being 50% active) and high molecular weight DADMAC of Applicant (referred to as CV 3650, having a molecular weight greater than 1 million and being 20% active), producing water with a turbidity of about 0.7 NTU without any filtration. The chemical dosages were approximately 12 ppm of the 50% active polyaluminum chloride/aluminum chlorohydrate blend and approximately 2.5 ppm of the 20% active high molecular weight DADMAC.

Jar testing with aluminum sulfate required approximately 50 ppm of 48% active aluminum sulfate and approximately 20 ppm low molecular weight 20% active DADMAC in concert with approximately 10 ppm clay. Without using any filtration, water with a turbidity of about 1.0 NTU was recovered.

EXAMPLE 2

In the water production facility of Camden, Ark., ferric sulfate is used to produce water with a turbidity of approximately 0.1 NTU. The alkalinity is normally near 10 ppm. The raw turbidity usually ranges between about 5 to about 20. Chemical dosages are normally about 30 ppm to about 60 ppm iron.

Jar tests were performed with a polyaluminum chloride/aluminum chlorohydrate blend of Applicant (being 50% active) and high molecular weight DADMAC of Applicant (referred to as CV 3650, having a molecular weight greater than 1 million and being 20% active), producing water with a turbidity at approximately 0.1 NTU without any filtration. Dosages were about 6 ppm of the 50% active polyaluminum chloride/aluminum chlorohydrate blend and about 2.5 ppm of the 20% active high molecular weight DADMAC.

Jar testing with the iron sulfate required approximately 40 ppm iron sulfate. Without using any filtration, water with a turbidity of about 1.5 NTU was recovered. Later, plant production testing revealed final water of 0.023 NTU with 7 ppm of the 50% active aluminum polymer blend and 2.0 ppm of the 20% active high molecular weight DADMAC.

EXAMPLE 3

In the water production facility of Antlers, Okla., aluminum sulfate is used alone to produce water having a turbidity ranging from about 0.1 NTU to about 0.3 NTU. The alkalinity is normally less than 10 ppm. The raw turbidity normally is between about 3 to about 10. The chemical dosage of alum normally ranges between about 40 ppm to about 60 ppm.

Jar tests were performed with a polyaluminum chloride/aluminum chlorohydrate blend of Applicant (being 50% active) and high molecular weight DADMAC of Applicant (referred to as CV 3650, having a molecular weight greater than 1 million and being 20% active), producing water with a turbidity at approximately 0.6 NTU without any filtration. The dosage of the polyaluminum chloride/aluminum chlorohydrate blend was about 8 ppm and of the high molecular weight DADMAC was about 2.5 ppm.

Jar testing with the aluminum sulfate required approximately 40 ppm aluminum sulfate and, without using any filtration, water with a turbidity of 1.0 NTU was recovered.

EXAMPLE 4

In the water production facility of Greenville, Tex., aluminum sulfate and a typical molecular weight DADMAC are used to produce water of a turbidity of less than 0.1 NTU. The alkalinity normally ranges from about 10 ppm to about 30 ppm. The raw turbidity normally is between about 3 to about 10. Chemical dosages are normally from about 40 ppm to about 60 ppm alum and about 2 ppm of a low molecular weight DADMAC.

Jar tests were performed with a polyaluminum chloride/aluminum chlorohydrate blend of Applicant (being 50% active) and high molecular weight DADMAC of Applicant (referred to as CV 3650, having a molecular weight greater than 1 million and being 20% active), producing water with a turbidity at approximately 0.4 NTU without any filtration. The dosage of the polyaluminum chloride/aluminum chlorohydrate blend was about 8 ppm and of the high molecular weight DADMAC was about 2.5 ppm.

Jar testing with aluminum sulfate required approximately 60 ppm aluminum sulfate and approximately 2 ppm of DADMAC and, without using filtration, water with a turbidity of approximately 0.8 NTU was recovered. In jar testing with aluminum sulfate, water pH was reduced to 6.1, while jar testing with polyaluminum chloride/aluminum chlorohydrate blend and high molecular weight DADMAC raised water pH from 6.6 to 7.1.

EXAMPLE 5

Formosa Plastics in Point Comfort, Tex., produces about 4 to 5 million gallons per day of wastewater. In the first stage of the wastewater treatment process, dissolved air flotation units are employed to remove oils at the surface and inorganic solids are removed by rake in the bottom of these units.

A low molecular weight DADMAC, blended with aluminum chlorohydrate had been in use having a turbidity/total suspended solids (NTU/TSS) removal efficiency in a range of between approximately 40 percent to approximately 50 percent. The low molecular weight DADMAC blend was added to the dissolved air flotation unit at a dosage of about 6 ppm to about 8 ppm. An anionic flocculant was added in a dosage ranging from about 1.0 ppm to about 1.5 ppm.

Fifty percent active aluminum chlorohydrate in a 60% ratio and 20% active high molecular weight DADMAC in a 40% ratio of Applicant (referred to as CV 3650, having a molecular weight greater than 1 million and being 20% active), were added to the dissolved air flotation unit at concentrations ranging from about 4 ppm to about 6 ppm in concert with an anionic flocculant ranging between approximately 1.0 ppm and approximately 1.5 ppm. This product increased the dissolved air flotation unit efficiency to over about 70 percent.

EXAMPLE 6

In DeQueen, Ark., alum is used in a final clarifier to remove algae prior to wastewater discharge. Removal of total suspended solids (TSS) is a critical discharge parameter, as with all wastewater treatment facilities. The dosage of alum typically ranges from about 100 ppm to about 250 ppm. Adding approximately 3 ppm to 5 ppm high molecular weight DADMAC causes a reduction of the required alum to less than 100 ppm, while keeping the total suspended solids less than 15 ppm.

Waste aluminum chloride (being 18% active and being obtained from a styrene production facility of Dow Chemical) was blended with high molecular weight DADMAC of Applicant (referred to as CV 3650, having a molecular weight greater than 1 million and being 20% active), in a ratio of 65:35. At dosages about 35 ppm and about 40 ppm of the blend, the plant was in permit at 6 ppm total suspended solids. (Permit is 15 ppm total suspended solids) Alum (obtained from 48% active liquid of General Chemical) alone required in excess of 200 ppm and said alum in combination with high molecular weight DADMAC required 90 ppm alum /4 ppm DADMAC, respectively.

EXAMPLE 7

In Beaumont, Tex., alum is used in a French Pulsation Clarification System. Typical values are between 20 ppm and 25 ppm of raw alkalinity, 8 ppm of calcium, raw number of turbidity units (NTU) of 40 to 60 and raw color of 40 to 80 units. Alum usage is normally 45 to 55 ppm at raw color units of 40 to 60. An anionic polyacrylamide is used in emulsion form at a dosage of 0.2 to 0.4 ppm to control pin floc carryover and floc size. As the raw color units rise, the alum usage increases such that at raw color units of 120 the alum usage is 90 to 100 ppm. The city of Beaumont normally utilizes 30 to 40 ppm of 50% caustic for pH adjustment, along with 55 ppm of caustic to pH adjust the alum sludge which would otherwise corrode the sewer line.

The optimal chemistry for Beaumont as performed in numerous jar tests is a combination of aluminum chlorohydrate of Applicant (referred to as CV 1120 and being 50% active), high molecular weight DADMAC of Applicant (referred to as CV 3650, having a molecular weight greater than 1 million and being 20% active), low molecular weight Epi-DMA of Applicant (referred to as CV 3210 and being 50% active) and aluminum chloride (referred to as CV 1135 and being 10% active) in combination with the anionic polyacrylamide. Utilizing this chemistry, dosages of 12 to 14 ppm obtained a final 1 micron filtered NTU of 0.08 along with 1 color unit. Plant operation with and jar tests with alum revealed final NTU's of 0.22 at 55 ppm. Adjustments of pH with alum required 32 ppm of 50% caustic where this chemistry only required 8 ppm.

Further, the higher pH values capable with this chemistry allowed for the removal of manganese from the raw water with potassium permanganate and chlorine dioxide. Neither of these chemicals can perform with alum as the low pH value for alum removes their oxidation potential.

EXAMPLE 8

In Marshall, Tex., alum is used in a sedimentation basin system. Typical values are between 20 ppm and 25 ppm of raw alkalinity, 12 ppm of calcium, raw number of turbidity units (NTU) of 5 to 8 and raw color of 40 to 200 units. Alum usage is normally 32 to 38 ppm. During periods of 200 raw color units, the city cannot maintain turbidity targets of 0.3 NTU or less. Augmentation of the alum with 1 ppm to 2 ppm of high molecular weight DADMAC of Applicant (referred to as CV 3650, having a molecular weight greater than 1 million and being 20% active), reduces final NTUs to less than 0.1 and allows the plant to stay in permit. Prior to usage of CV 3650, the plant went out of permit with high color raw water.

Jar tests with a combination of aluminum chlorohydrate of Applicant (referred to as CV 1120 and being 50% active), high molecular weight DADMAC of Applicant (referred to as CV 3650, having a molecular weight greater than 1 million and being 20% active), low molecular weight Epi-DMA of Applicant (referred to as CV 3210 and being 50% active) and aluminum chloride (referred to as CV 1135 and being 10% active) produced a settled 0.7 NTU at a dosage of 8 ppm. This compares favorably to 32 ppm alum and 2 ppm of CV 3650 obtaining 0.6 NTU in the same test.

EXAMPLE 9

In Longview, Tex., alum is used in a sedimentation basin system. Typical values are between 20 ppm and 25 ppm of raw alkalinity, 10 ppm of calcium and raw number of turbidity units (NTU) of 1 to 3. Alum usage is normally 18 to 25 ppm. Final NTU is normally 0.15 to 0.20.

The optimal chemistry for Longview as performed in numerous jar tests is a combination of aluminum chlorohydrate of Applicant (referred to as CV 1120 and being 50% active), high molecular weight DADMAC of Applicant (referred to as CV 3650, having a molecular weight greater than 1 million and being 20% active), low molecular weight Epi-DMA of Applicant (referred to as CV 3210 and being 50% active) and high molecular weight Epi-DMA of Applicant (referred to as CV 3250 and being 50% active). This combination at dosages of 3 to 4 ppm produces 0.17 NTU water in a 1 micron filtered jar test while alum at 18 ppm produced 0.16 NTU. The alum required a 300 percent increase in lime to pH adjust as compared to this new chemistry.

EXAMPLE 10

In Nederland, Tex., PRC 3050C is used in a solids contact clarification system. Typical raw alkalinity values are between 0 ppm and 30 ppm. Polymer usage is very dependent on the raw color which can vary from 20 to over 300. Polymer usage varies from about 15 ppm to over 70 ppm. Final NTU is normally less than 0.10.

The optimal chemistry for Nederland as performed in numerous jar tests is a combination of aluminum chlorohydrate of Applicant (referred to as CV 1120 and being 50% active), high molecular weight DADMAC of Applicant (referred to as CV 3650, having a molecular weight greater than 1 million and being 20% active), low molecular weight Epi-DMA of Applicant (referred to as CV 3210 and being 50% active) and aluminum chloride (referred to as CV 1135 and being 10% active). This combination produced 0.6 NTU water beside the current system that produced 0.8 NTU at 16 ppm, on the day tested. Testing with tannic acid found the new chemistry to significantly remove more color than the PRC 3050C. Raw water testing from the Neches River Upstream of Nederland found that water spiked with tannic acid to 120 color units had a removal to 14 color units with this chemistry while the current system only obtained 32 color units.

EXAMPLE 11

In Omaha, Nebr., a cold lime softening system is used to clarify high turbidity water from the Missouri River. Pretreatment is normally done with a typical DADMAC (having a molecular weight near 200,000 and being 20% active producing 200 cps). Usage of the high molecular weight DADMAC reduced operating dosages by over 70% while producing water at less than 0.1 NTU. The DADMAC is also used as a filter aid at this facility.

Further, at Omaha, to meet competitive bidding requirements, high molecular weight DADMAC of Applicant (referred to as CV 3670, having a molecular weight greater than 1 million and being 10% active) was delivered as 10% active at viscosities of 150 to 250 cps. The previous low molecular weight version was 20% active at 200 cps. At only 10% activity, the CV 3670 still outperformed the low molecular weight version by 25 to 30 percent in dosage.

EXAMPLE 12

In Hugo, Okla., aluminum chlorohydrate is used in a reactor clarification system. Typical raw alkalinity values are 5 to 25 ppm and the raw NTU is 3 to 20. Usage of low molecular weight Epi-DMA (being 50% active) is normally 3 to 5 ppm and usage of aluminum chlorohydrate (being 50% active) is normally 20 to 35 ppm. Final water production is normally less than 0.3 NTU. Color is not measured.

High molecular weight DADMAC of Applicant (referred to as CV 3650, having a molecular weight greater than 1 million and being 20% active) was used in concert with aluminum chlorohydrate of Applicant (referred to as CV 1120 and being 50% active). Where normal plant operation and the jar tests showed current operation to require 30 ppm of aluminum chlorohydrate in concert with 3 ppm of Epi-DMA, the new chemistry only required 20 ppm of CV 1120 (50% active aluminum chlorohydrate) in concert with 2 ppm of CV 3650 (20% active high-molecular weight DADMAC at 2,000 cps). The old chemistry only obtained 0.7 NTU at about 40% greater cost.

EXAMPLE 13

In Mena, Ark., alum is used in concert with an anionic polyacrylamide in a solids contact clarification system. Typical raw alkalinity values are 3 to 20 ppm and the raw NTU is 3 to 10. Alum usage is normally 40 to 60 ppm along with an excess of 20 ppm of 50% caustic in combination with 10 to 20 ppm of lime. The plant normally produces less than 0.3 NTU.

High molecular weight DADMAC of Applicant (referred to as CV 3650, having a molecular weight greater than 1 million and being 20% active) was used in concert with aluminum chlorohydrate (referred to as CV 1120 and being 50% active). Where normal plant operation and the jar tests showed current operation to require 40 ppm of alum, the new chemistry only required 4 ppm of CV 1120 (50% active aluminum chlorohydrate) in concert with 1.5 ppm of CV 3650 (20% active DADMAC at 2,000 cps). The new chemistry obtained 0.7 NTU in the jar test, while the old chemistry only obtained 1.0 NTU at about 70% greater cost. At this facility, it is very difficult to obtain a floc at all due to the combination of low alkalinity and low NTU. Therefore, large amounts of alum are normally required. However, CV 1120 and CV 3650 were able to develop a floc easily. Further testing with low molecular weight Epi-DMA (of a molecular weight of 100,000) or low molecular weight DADMAC (of a molecular weight of 200,000) showed no ability to develop a floc and clean the water.

EXAMPLE 14

In Palestine, Tex., alum is used alone in a sedimentation basin system. Typical raw alkalinity values are 20 to 50 ppm and the raw NTU is 5 to 30. The plant normally produces less than 0.1 NTU.

In jar tests, an optimum alum NTU of 0.7 was obtained. By augmenting the jar tests with 1 ppm of high molecular weight DADMAC of Applicant (referred to as CV 3670, having a molecular weight greater than 1 million and being 10% active), the alum dosage was reduced by 40% while 0.6 NTU water was produced.

EXAMPLE 15

In DeQueen, Ark., the municipal wastewater plant performs nitrification in a 40 acre pond system. From 3 to 5 times per year, this pond system has an algal bloom of blue/green algae. Blue/green algae emit a nitrogen containing polymer that is toxic to nitrifying microorganisms. Therefore, during periods of blue/green algae blooming, the plant looses its ability to nitrify, producing water laden with ammonia that is in excess of state and federal permit values.

Testing performed with high molecular weight DADMAC of Applicant (referred to as CV 3650, having a molecular weight greater than 1 million and being 20% active at 2,000 cps), in combination with Diuron (3-(3,4-Dichlorophenyl)-1,1dimethyl urea manufactured by Dupont) proved that this chemistry blend will flocculate and kill the algae while not harming the nitrosomonas or the nitrobactors. The blend put together was CV 3670 (a high molecular weight DADMAC produced by Applicant, having a molecular weight greater than 1 million and being 10% active at 2,000 cps) with 10 percent Diurion added by weight.

Two tests were set up: one to measure algal killing performance and one to measure nitrification effectiveness with the product blend. In each test there was a control, one container having 10 ppm of the blend and one container having 25 ppm of the blend. To test for algal growth, water samples were placed in three 5 gallon buckets. To test for nitrification, water samples were placed in three 1000 ml beakers. In the beakers, nitrification performance compared to the QC Specification for CV Bio 3010XS (a blend of nitrifiers comprising nitrosomonas and nitrobacters) which is 500 mg of ammonia removed per hour per liter of nitrifiers at 100° F. For the three beakers, variance was well within testing and measurement capabilities (480 mg to 520 mg of ammonia removed/hr/liter of nitrifier). For the three 5 gallon buckets, there was complete algal kills at both 10 and 25 ppm. The control bucket had a flourishing algal bloom throughout the test. It is worth noting that at 25 ppm, the algae was flocculated as well as it was killed.

EXAMPLE 16

In Beaumont, Tex., alum is used in a French Pulsation Clarification System. Typical values are between 20 ppm and 25 ppm of raw alkalinity, 8 ppm of calcium, raw number of turbidity units (NTU) of 40 to 60 and raw color of 40 to 80 units. Alum usage is normally 45 to 55 ppm at raw color units of 40 to 60. An anionic polyacrylamide is used in emulsion form at a dosage of 0.2 to 0.4 ppm to control pin floc carryover and floc size. As the raw color units rise, the alum usage increases such that at raw color units of 120 the alum usage is 90 to 100 ppm. The city of Beaumont normally utilizes 30 to 40 ppm of 50% caustic for pH adjustment, along with 55 ppm of caustic to pH adjust the alum sludge which would otherwise corrode the sewer line.

During numerous jar tests, a combination of aluminum chlorohydrate of Applicant (referred to as CV 1120 and being 50% active), high molecular weight DADMAC of Applicant (referred to as CV 3650, having a molecular weight greater than 1 million and being 20% active) and aluminum chloride (referred to as CV 1135 and being 10% active). The blend comprises 40% CV 1120, 30% CV 1135 and 30% CV 3650. Utilizing this chemistry, dosages of 18 to 22 ppm obtained a final 1 micron filtered NTU of 0.2 to 0.8.

EXAMPLE 17

In Nederland, Tex., PRC 3050C is used in a solids contact clarification system. Typical law alkalinity values are between 0 ppm and 30 ppm. Polymer usage is very dependent on the raw color which can vary from 20 to over 300. Polymer usage varies from about 15 ppm to over 70 ppm. Final NTU is normally less than 0.10.

On this day operation was 32 ppm of PRC 3050C. The raw water was 45 NTU. Color was not measured. Visually, one could estimate a color of 50 to 75 standard color units. A blend of aluminum chlorohydrate of Applicant (referred to as CV 1120 and being 50% active), high molecular weight DADMAC of Applicant (referred to as CV 3650, having a molecular weight greater than 1 million and being 20% active) was prepared for a settled jar test. The preferred embodiment enclosed a blend of 60% CV 1120 and 40% CV 3650. At concentrations of 24 to 28 ppm, NTUs of 0.4 to 0.7 were obtained.

On the same day, a blend of aluminum chlorohydrate of Applicant (referred to as CV 1120 and being 50% active), high molecular weight DADMAC of Applicant (referred to as CV 3650, having a molecular weight greater than 1 million and being 20% active) and aluminum chloride (referred to as CV 1135 and being 10% active) was prepared. This combination produced a blend of 40% CV 1120, 20% CV 1135 and 40% CV 3650. In a settled jar test, NTUs of 0.6 to 0.9 were obtained at dosages of 28 to 36 ppm.

It is also inherently obvious that the production of these high molecular weight polymers is more costly than their low molecular weight counterparts due to equipment investment and equipment utilization. Quaternized organic polymers obtain their molecular weight in direct proportion to reactor residence time. Production of organic polymers with high molecular weights requires significantly increased reaction times. Further, production of high molecular weight polymers necessitates improvements in equipment due to viscosity increases that occur at molecular weights over 1,000,000. Only recently have these equipment restrictions been overcome. Due to these production expenses, industry took many years to address the production technology issues. The new quaternized high molecular weight polymers can now be combined with the new aluminum polymers to create a novel generation of water treatment chemicals.

The timing of the invention is significant since presently the USEPA is requiring a lowering of drinking water final turbidity targets. Traditionally, drinking water production turbidity targets were 0.5 NTU. The new standards for the turbidity of drinking water are 0.3 NTU, with 0.1 NTU to be achieved in 3 to 5 years. In many instances the traditional salt and polymer technology does not provide an economical chemical pathway to water production for a turbidity of 0.1 NTU.

Certain objects are set forth above and made apparent from the foregoing description and examples. However, since certain changes may be made in the above description and examples without departing from the scope of the invention, it is intended that all matters contained in the foregoing description and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed is:

1. A process for clarification of water of raw alkalinity less than or equal to 50 ppm by chemical treatment, said process comprising:

adding to the water and, prior to or after adding to the water, blending at least one aluminum polymer with a high molecular weight quaternized ammonium polymer in an amount sufficient to form a flocculated suspension in the water and to remove turbidity from the water, said high molecular weight quaternized ammonium polymer comprising at least an effective amount of high molecular weight di-allyl di-methyl ammonium chloride (DADMAC) having a molecular weight of at least approximately 1,000,000 to approximately 3,000,000 and said aluminum polymer including at least an effective amount of poly-aluminum hydroxychloride of a basicity equal to or greater than 50%.

2. The process for clarification of water according to claim 1, wherein said water has an alkalinity of less than 30 ppm.

3. The process for clarification of water according to claim 1, wherein said di-allyl di-methyl ammonium chloride is added in sufficient quantity to remove algae from said water during clarification.

4. The process for clarification of water of claim 1, the water having an alkalinity of either less than 30 ppm or a turbidity of greater than 150 NTU including blending at least one aluminum salt with said aluminum polymer and said quaternized ammonium polymer.

5. The process for clarification of water according to claim 4, wherein said aluminum salt and said quaternized ammonium polymer are blended in sufficient proportion and quantity to remove algae from said water during clarification.

6. The process for clarification of water according to claim 4, wherein the aluminum salt is an aluminum sulfate.

7. The process for clarification of water according to claim 6, wherein said aluminum sulfate is used with said di-allyl di-methyl ammonium chloride that is 10% active at viscosities of 150 to 250 cps.

8. The process of claim 1 that includes adding high molecular weight epichlorohydrin di-methyl amine (Epi-DMA) having a molecular weight of at least approximately 500,000 to approximately 3,000,000.

9. The process of claim 1 that includes adding low molecular weight epichlorohydrin di-methyl amine (Epi-DMA) having a molecular weight of at least approximately 20,000 to 500,000 or low molecular weight DADMAC.

10. A process for clarification of water and reduction of color and turbidity of water by chemical treatment of said water, said process comprising:

adding to the water and, prior to or after adding to the water, blending a combination of at least one aluminum salt and at least one aluminum polymer with a quaternized ammonium polymer in an amount sufficient to form a flocculated suspension in the water and to remove color and turbidity from the water, said quaternized ammonium polymer comprising an effective amount of high molecular weight di-allyl di-methyl ammonium chloride (DADMAC) having a molecular weight of at least approximately 1,000,000 to approximately 3,000,000 and said aluminum polymer including at least an effective amount of polyaluminum hydroxy chloride.

11. The process for clarification of water according to claim 10, wherein said water has an alkalinity of less than 30 ppm or turbidity of greater than 150 NTU.

12. The process for clarification of water according to claim 10, wherein the aluminum polymer further comprises poly-aluminum chloride or poly-aluminum siloxane sulfate.

13. The process for clarification of water according to claim 10, wherein the aluminum salt comprises an aluminum sulfate, an aluminum chloride or any combination of an aluminum sulfate and an aluminum chloride.

14. The process for clarification of water according to claim 10, wherein said combination is blended with at least one quaternized ammonium polymer in sufficient proportion and quantity to remove algae from said water during clarification.

15. The process for clarification of water according to claim 10 that includes adding low molecular weight epichlorohydrin di-methyl amine (Epi-DMA) having a molecular weight of approximately 20,000 to 500,000 or low molecular weight DADMAC.

16. The process for clarification of water according to claim 10 that includes adding high molecular weight epichlorohydrin di-methyl amine (Epi-DMA) having a molecular weight of approximately 500,000 to approximately 3,000,000.

17. A process for clarification of water and reduction of color and turbidity of water by chemical treatment of said water, said process comprising:

adding to the water and, prior to or after adding to the water, blending:

at least one aluminum salt, at least one aluminum polymer, at least one high molecular weight quaternized ammonium polymer and either low molecular weight epichlorohydrin di-methyl amine (Epi-DMA) having a molecular weight ranging from 20,000 to 500,000, or low molecular weight di-allyl di-methyl ammonium chloride (DADMAC) having a molecular weight ranging from 50,000 to 1,000,000, or a combination of both, wherein the high molecular weight quaternized ammonium polymer includes at least an effective amount of high molecular weight di-allyl of methyl ammonium chloride (DADMAC) having a molecular weight of at least approximately 1,000,000 to approximately 3,000,000 and wherein the aluminum polymer includes at least an effective amount of polyaluminum hydroxy chloride to form a flocculated suspension in the water and remove turbidity from the water.

18. The process for clarification of water according to claim 17, wherein said water has an alkalinity of less than 30 ppm.

19. The process for clarification of water according to claim 17, wherein the aluminum polymer further includes poly-aluminum chloride or poly-aluminum siloxane sulfate.

20. The process for clarification of water according to claim 17, wherein the aluminum salt comprises an alum, an aluminum chloride or any combination of an alum and an aluminum chloride.

21. The process for clarification of water according to claim 17, wherein said aluminum salt, said aluminum polymer, said high molecular weight quaternized ammonium polymer and said low molecular weight Epi-DMA or DADMAC, or said combination of low molecular weight Epi-DMA and DADMAC, are blended in sufficient proportion and quantity to remove algae from water during clarification.

22. The process for clarification of water according to claim 17 that includes adding high molecular weight epichlorohydrin di-methyl amine (Epi-DMA) having a molecular weight of at least approximately 500,000 to approximately 3,000,000.

* * * * *